Oct. 19, 1965  H. L. CRUMPLER  3,212,154
APPARATUS FOR PRODUCING CONDUIT STRUCTURES BY EXTRUSION
Filed March 6, 1963  3 Sheets-Sheet 1
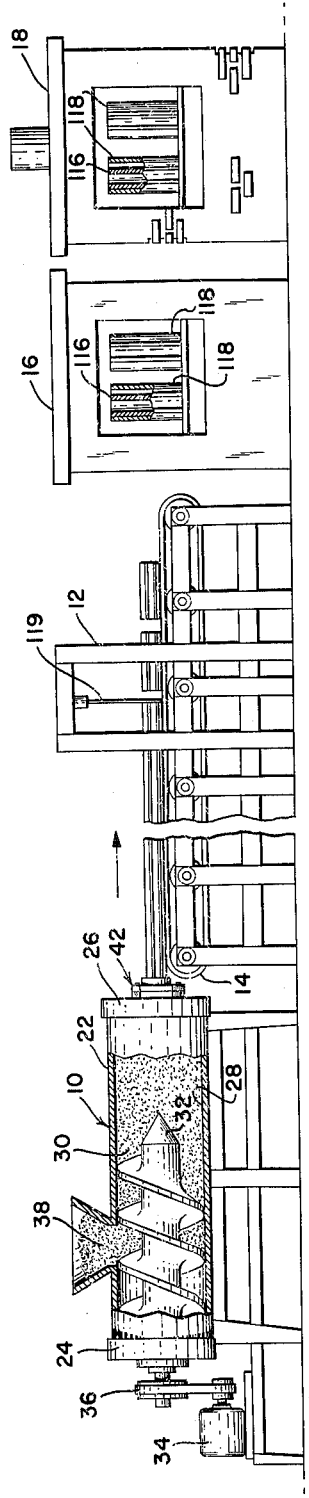
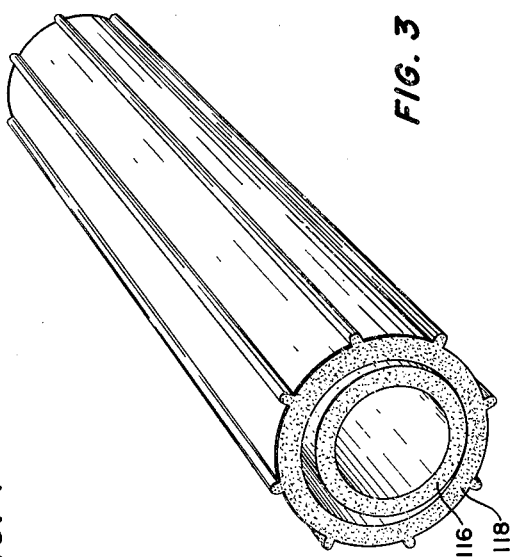
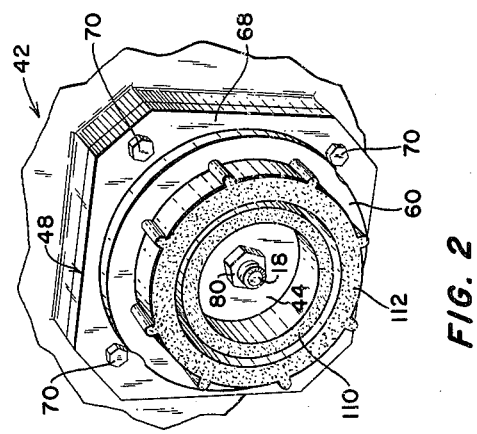
INVENTOR.
HOUSTON L. CRUMPLER
BY
Strauch, Nolan & Neale
ATTORNEYS INVENTOR.
HOUSTON L. CRUMPLER
BY
Strauch, Nolan & Neale
ATTORNEYS Oct. 19, 1965  H. L. CRUMPLER  3,212,154
APPARATUS FOR PRODUCING CONDUIT STRUCTURES BY EXTRUSION
Filed March 6, 1963  3 Sheets-Sheet 3
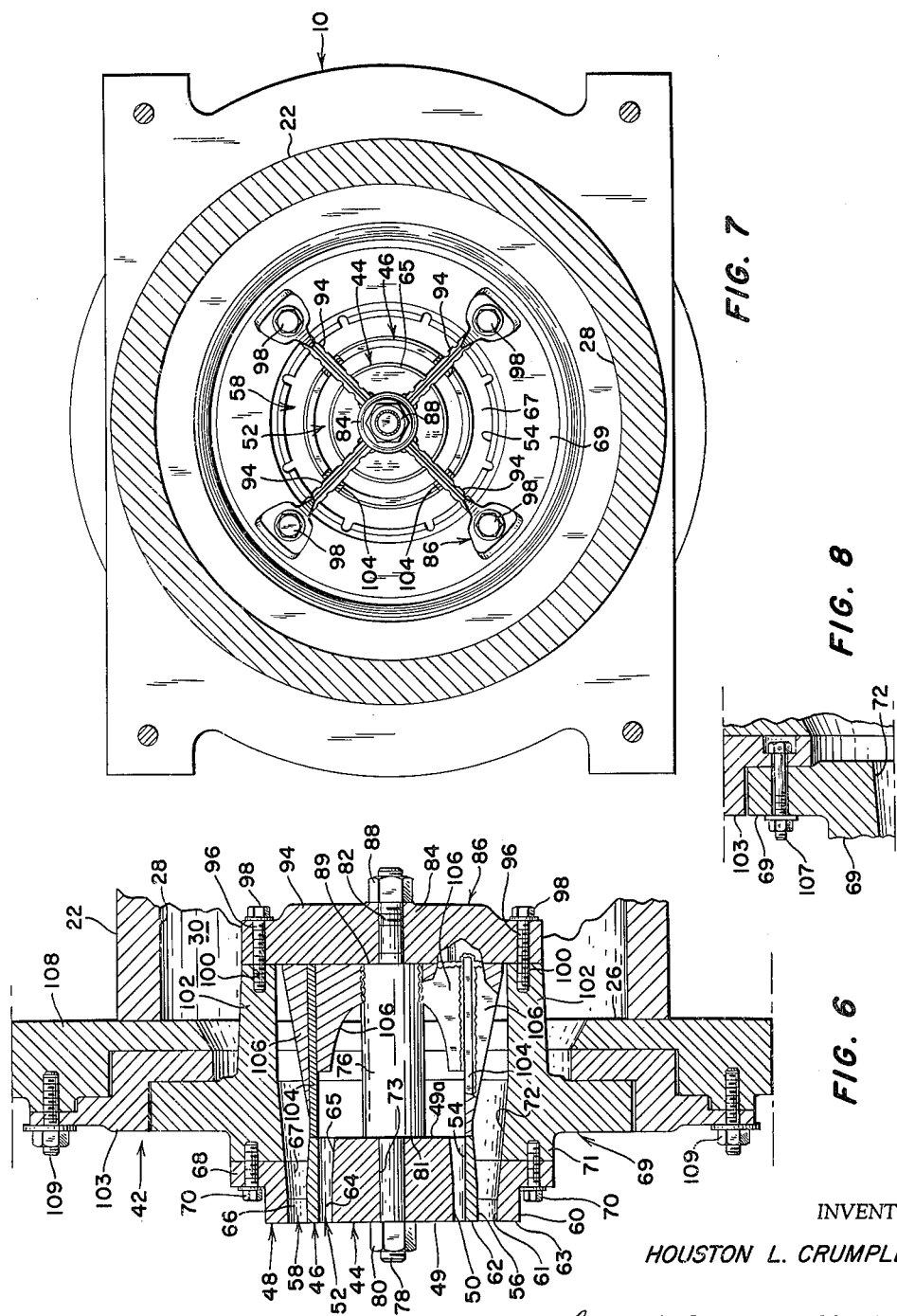
INVENTOR
HOUSTON L. CRUMPLER
BY Strauch, Nolan & Neale
ATTORNEYS

United States Patent Office 3,212,154
Patented Oct. 19, 1965

3,212,154
APPARATUS FOR PRODUCING CONDUIT STRUCTURES BY EXTRUSION
Houston L. Crumpler, P.O. Box 68, Roseboro, N.C.
Filed Mar. 6, 1963, Ser. No. 263,197
2 Claims. (Cl. 25—17)

The present invention relates to the manufacture of conduit structures and is especially concerned with a novel die structure for extruding fluid conduits such as clay drain tile, sewer pipes and like ware.

In the past, it has been customary to employ extrusion machines, commonly known as "brick" machines, to produce ceramic conduit-like structures such as drain tile and sewer pipe. Extrusion machines of this type essentially comprise a barrel providing a pressure chamber and having an open discharge end in which an extruding die is mounted. Extrudable material, such as plastic clay or plastic clay and non-plastic grog mixture, is introduced into the pressure chamber and is forced under pressure through the die by a powered auger or pressure screw rotatably mounted within the barrel. The extruded material emerges from the die as a continuous discrete column and is thereafter cut into sections of selected axial lengths. The green lengths of cut ware are afterwards dried and fired in a kiln to produce a final product having desired physical properties. With the conventional extruding apparatus for producing conduits, ceramic tile, sewer pipe and other ware, however, one discrete column of one predetermined size can be extruded at one time with one die. When it is desired to produce a different size of drain tile or sewer pipe with the same conventional machine, it is necessary to stop production and change the extruding die.

With the present invention, however, two or more discrete disjointed differently sized conduits, drain tile, sewer pipe or other similar forms of ware are extruded concomitantly in the same machine, using but a single die of novel construction.

By utilizing a die constructed according to the principles of the present invention, the extruded material emerges as continuous hollow discrete unconnected or disjointed columns nested coaxially one within the other. This arrangement has the particular advantage of at least effectively doubling the productive output of a given extrusion machine without any increase in power consumption. It also eliminates the necessity of requiring a shut down and changing of dies in order to produce a different size of conduit as characterized by conventional forms of extrusion machines.

As a consequence of this feature of extrudinv coaxially nested discrete columns of different sizes, both columns can be divided into coextensive inner and outer sections of selected length in a single cutting operation and the coextensive sections can be dried and fired without removal of the inner section from its nested position within the outer section, thus promoting further savings in overall manufacturing costs.

With the above in mind, it is the major object of the present invention to provide a novel die structure for at least doubling the output capacity of a conventional extrusion machine without any significant increase in the amount of power consumed.

More specifically, it is the object of the present invention to provide a novel die structure which extrudes material simultaneously as concentric radially spaced apart discrete disjointed hollow columns.

Further objects of the invention will presently appear as the description proceeds in connection with the annexed claims and the appended drawings wherein:

FIGURE 1 is an essentially diagrammatic side elevation of the extruding, cutting drying and firing apparatus for producing clay tile and like ware in accordance with the principles of the present invention and illustrating the barrel-like casing of the extrusion machine partially broken away to show interior details thereof;

FIGURE 2 is an enlarged perspective view of the die structure mounted in the front end of the extrusion machine illustrated in FIGURE 1;

FIGURE 3 is an enlarged perspective view of the nested inner and outer discrete columnar sections of green ware cut from the discrete continuous columns extruded by the machine illustrated in FIGURES 1 and 2;

FIGURE 6 is a section taken substantially along lines 6—6 of FIGURE 4;

FIGURE 7 is a rear view of the die illustrated in FIGURE 4 and taken substantially along lines 7—7 of FIGURE 5; and FIGURE 8 is a section taken substantially along lines 8—8 of FIGURE 4.

Figure 5:
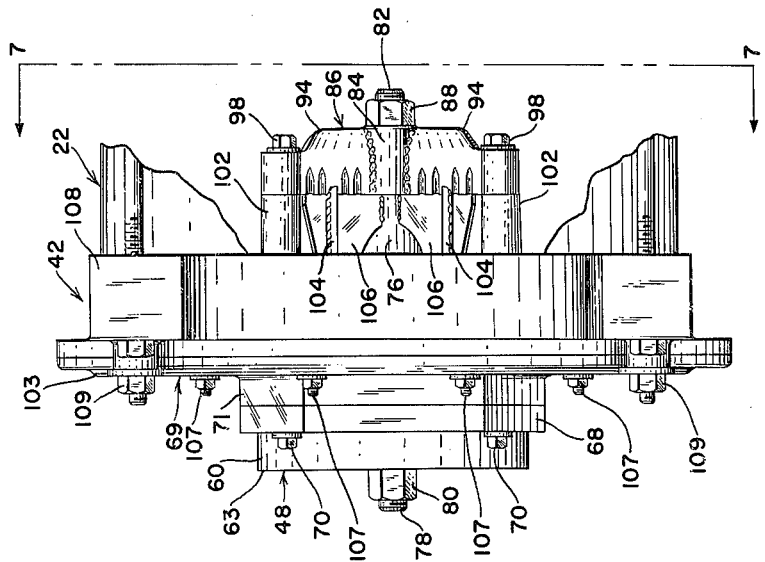
FIGURE 5 is a side elevation of the die shown in FIGURE 4 with the barrel of the extrusion machine being broken away.

Referring now to the drawings and more particularly to FIGURE 1, the manufacture of drain tile, sewer pipe or like ware involves the extrusion of plastic clay or a mixture of plastic clay and non-plastic grog preferably tempered with water and pugged. The term grog is generally used to essentially signify any clay-like material that has been fired to a temperature wherein its characteristic plasticity is destroyed. Also, plastic clay may be advantageously mixed with saw dust in proportions up to 30% in a conventional manner. This plastic mass is fed into an extruding machine 10, to be later described in detail, and emerges therefrom in the form of a continuous column having a desired die-formed cross sectional configuration such as, for example, an essentially annular cross section of drain tile. This continuous column of green ware is carried to a cutting station 12 on a suitable conveyor belt assembly 14 where it is cut into suitable axial lengths to facilitate convenient handling. The cut sections of green ware are thereafter successively conveyed to a dry station 16 and a kiln station 18 in batches where they are respectively dried and fired to produce final products having desired physical properties in accordance with known treatment conditions.

Extrusion machine 10 comprises a horizontally rigidly mounted barrel 22 having a closed end 24 and an axially opposed open discharge end 26. Barrel 22 is formed between ends 24 and 26 with a smooth cylindrically walled bore 28 defining a pressure chamber 30.

With continued reference to FIGURE 1, a horizontal pressure screw or auger 32 is rotatably mounted within pressure chamber 30 in coaxial alignment with the axis of bore 28 and is drivingly connected to a motor 34 or other suitable form of prime mover through a suitable drive connection such as a belt drive 36. The top of barrel 22 is provided with an aperture 38 through which the plastic mass of clay to be extruded is fed to pressure screw 32. Pressure screw 32 terminates at its inner end in axial spaced relation to discharge end 26 to define therebetween a pressure zone through which the plastic clay to be extruded is forced under pressure.

The above described apparatus comprises essentially the main components of the conventional type of "brick" extrusion machine together with the suitable known forms of cutting, drying and kiln stations for producing ceramic drain tile, sewer pipe and like ware.

Mounted in the discharge end 26 of barrel 22 is a novel extrusion die 42 constructed in accordance with the present invention for extruding the plastic clay simultaneously as continuous inner and outer concentric radially spaced apart discrete unconnected or disjointed columns of essentially tubular configuration.

Figure 4:
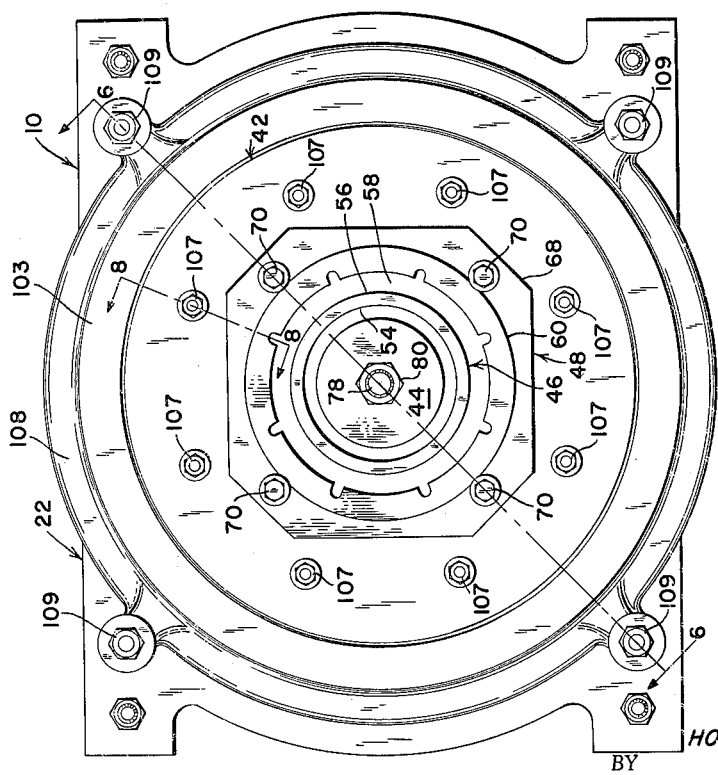
FIGURE 4 is an enlarged front end elevation of the extrusion machine illustrated in FIGURE 1 and showing the front face of the extrusion die constructed in accordance with the principles of the present invention.

With reference now to FIGURES 2, 4 and 6, die 42 comprises a central core 44, and intermediate annular die member 46 and an outer centrally apertured die member 48. Core 44 is disposed in coaxial alignment with the longitudinal axis of barrel 22 and has oppositely directed flat parallel front and rear end faces 49 and 49a (FIGURE 6) respectively which lie in planes extending at right angles to the longitudinal barrel axis. Core 44 is formed with a smooth cylindrical peripheral surface delimiting the inner periphery of a narrow unobstructed die emergent annular axially extending extrusion throat 52.

With continued reference to FIGURE 6, annuluar die member 46 is disposed in concentric surrounding radially spaced apart relation to core 44 and has oppositely facing smooth cylindrically shaped peripheral surfaces 54 and 56 respectively delimiting the outer periphery of extrusion throat 52 and the inner periphery of an outer unobstructed die emergent axially extending annular extrusion throat 58 concentrically surrounding the inner extrusion throat 52.

Outer die member 48 is formed with a rim portion 60 having a smooth cylindrical radially inwardly directed peripheral surface 61 disposed in concentric radially spaced apart surrounding relationship to the outer peripheral surface 56 of annular die member 46. Rim surface 61 delimits the outer periphery of throat 58.

Die members 46 and 48 are respectively formed with flat front end faces 62 and 63 which lie in a common plane containing end face 49 of core 44 and extending at right angles to the longitudinal axis of barrel 22. Throat 52 delimited by core 44 and die member 46 is formed with an annular uniformly diametered passage section 64 and an annular converging mouth 65. Passage section 64 extends axially rearwardly from the front end faces 49 and 62 of core 44 and die member 46 and mouth 65 convergingly extends axially forwardly from the rear end face 49a of core 44 and smoothly merges with passage section 64 to about midway between end faces 49 and 49a. Similarly, extrusion throat 58 is formed with an annular uniformly diametered passage section 66 and an annular converging mouth 67. Passage section 66 extends axially rearwardly from front end faces 62 and 63 and mouth 67 convergingly extends axially forwardly from the rearwardly facing end of die member 46 and smoothly merges with passage section 66 about midway between the axially directed end faces of die member 46. The outer diameter of outer throat 58 is substantially smaller than the diameter of barrel bore 28 as best shown in FIGURE 6.

With continued reference to FIGURES 2, 4 and 6, outer die member 48 is provided with a mounting flange portion 68 integrally surrounding rim portion 60 and fixed solely to a support plate 69 as by a series of four circumferentially spaced apart machine screws indicated at 70. Support plate 69 is integrally formed with a central hollow boss 71 disposed in coaxial alignment with the longitudinal axis of barrel 22 and having a flat front end face interfittingly abutting the back of mounting flange portion 68.

As best shown in FIGURE 6, the interior of boss 71 is formed with a smooth coaxial tapering wall surface 72 which cooperates with die member 46 to form a continuation of mouth 67.

With continued reference to FIGURE 6, core 44 is formed with a coaxial smooth through bore 73. Slidably and coaxially extending through bore 73 is a cylindrically shaped rod member 76 terminating at its forward end in a reduced diametered threaded section 78 projecting beyond the front face of core 44. A nut 80 threaded on section 78 abuts front face 49 of core 44 to tightly maintain end face 49a of core 44 in abutment with a shoulder 81 formed on rod member 76.

With reference to FIGURES 5–7 the opposite end of rod member 76 extending coaxially rearwardly of core member 44 terminates in a reduced diametered threaded section 82 which slidably and coaxially extends through and beyond a hub portion 84 of a bridging member 86. A nut 88 threaded on section 82 abuts against the rearwardly axially directed face of hub portion 84 to cooperate with nut 80 for securing core 44, bridging member 86 and rod member 76 together as a unit with hub 84 of bridging member 86 being axially confined against movement between nut 88 and an annular shoulder 89 formed on rod member 76. The major diameter of rod member 76 is appreciably smaller than the outer diameter of core 44.

With continued reference to FIGURES 5–7, bridging member 86 is provided with a series of four equiangularly spaced apart arms 94 preferably formed integral with hub portion 84 and extending radially outwardly across the path leading from pressure chamber 30 to the entrances of extrusion throats 52 and 58. Arms 94 are spaced axially rearwardly from the entrance to extrusion throats 52 and 58 and are formed at their outer ends with parallel axially extending through bores indicated at 96 (FIGURE 6). Bridging member 86 is detachably secured to support member 69 by a series of machine screws 98 extending through bores 96 and threadedly received in blind tapped bores 100 (FIGURE 6) formed in integral discrete lug portions 102. Lug portions 102 are integral with and extend axially rearwardly from support plate 69 and through a mounting ring 103.

The ends of arms 94, as best shown in FIGURES 5 and 6, axially abut the end faces of lug portion 102 so that bridging member 86 is disposed axially rearwardly by predetermined distance from annular die member 46, core 44, and outer die member 48. Core 44 thus is fixed solely to rod member 76 which, in turn, is fixed only to bridging member 86.

With continuing reference to FIGURES 5 and 6, annular die member 46 is solely and only fixed to arms 94 of bridging member 86 by means of a series of circumferentially spaced apart axially extending bar-like members 104 which are preferably welded at opposite ends to the rearwardly directed end face of annular die 46 and the opposed edges of arms 94. The thicknesses of bar members 104 are substantially equal to the thickness of annular die member 46 so as not to interfere with the movement of the plastic mass being forced through extrusion throats 52 and 58.

To improve the rigidity of the die structure thus far described, thin flat sided web portions indicated generally at 106 may be welded to bar members 104 and arms 94 and also to rod member 76 and arms 94. Web portions 106 terminate at a distance spaced axially rearwardly of the entrances to extrusion throats 52 and 58 for a purpose as will presently be described.

With the foregoing die structure, it will be appreciated that the path leading from pressure chamber 30 to the entrances of extrusion throats 52 and 58 is interrupted only by arms 94 and web portions 106. Furthermore, it will be appreciated that outer die member 48 is supported only from plate 69 and that core 44 and annular die 46 are supported only from bridging member 86 which, in turn, is supported solely from plate 69. The rearward end of die 42 is spaced axially from pressure screw 32 as shown.

Support plate 69 is detachably fixed to mounting ring 103 as by a series of circumferentially spaced studs 107 (one shown in FIGURE 8). Ring 103 is detachably fixed to a front end portion 108 of barrel 22 as by circumferentially spaced stud and nut assemblies 109 to thus secure die 42 in the front end of barrel 22.

In operation, plastic clay is introduced into pressure chamber 30 through aperture 38 in barrel 22 where it is compacted and pressurized by pressure screw 32 and forced through the pressure zone between screw 32 and die 42 and then simultaneously through extrusion throats 52 and 58. The mass of clay in pressure chamber 30 is preferably deaerated in a manner well known to the art.

As the cylindrical mass of plastic clay is forced axially towards the discharge end 26 of barrel 22 it sweeps around and is radially split only by the bridging arms 94. The axially extending free space between the entrances to extrusion throats 52 and 58 and arms 94 together with webs 106 is made sufficiently large as to allow the mass of plastic clay to cohesively knit together and to form a solid annular mass in barrel 22 in surrounding relation to rod member 76. This arrangement enables the formation of an uninterrupted solid annular mass of plastic clay at the entrances to extrusion throats 52 and 58 which assures the uniform distribution of the plastic clay as it is extruded.

The annular mass of plastic clay formed around rod member 76 is forced into extrusion throats 52 and 58 under the pressure applied by screw 32 and emerges from the opposite side of die 42 simultaneously as concentric radially spaced apart inner and outer discrete disjointed or unconnected tubular column respectively identified by the reference numerals 110 and 112 in FIGURE 2. It will be appreciated that columns 110 and 112 are disjointed particularly in the respect that there are no interconnections, such as web or bridging formations, joining the columns. The inner column is thus completely structurally free of any connection to the outer column.

Thus, the productive capacity of extrusion machine 10 containing the die 42 according to the present invention is effectively doubled in that two discrete column sizes, such as 6 inch and 4 inch, are simultaneously extruded instead of extruding only one discrete column. It has been found that this doubled capacity of extrusion machine 10 is unexpectedly achieved with no increase in power consumed for driving pressure screw 32. In effect, the horsepower requirements for extruding one discrete column as with conventional machines, and for extruding two discrete columns in accordance with the present invention are the same.

It will be appreciated that the number of extrusion throats in die 42 can be increased by adding an additional number of intermediate die members 46 to thus simultaneously extrude more than two discrete tubular columns. It also will be appreciated that the cross section of the extruded columns need not necessarily be annular but may be of other desired configuration.

As the inner and outer discrete extruded columns 110 and 112 emerge from die 42, the outer column 112 is supportingly engaged by conveyor 14 which carries columns 110 and 112 in their concentric relationship to cutting station 12. Cutting station 12 is sufficiently close to die 42 that inner column 110 is maintained by its rigidity in spaced radial relation to the inner periphery of outer column 112 as both columns pass through the cutting station.

As shown in FIGURE 1, columns 110 and 112, still disposed in their concentric relation, are divided at cutting station 12 into nested coextensive sections 116 and 118 (FIGURE 3) of selected axial lengths. These coextensive sections 116 and 118, it is clear, are severed from the ends of their respective columns 110 and 112 in a single cutting operation as by a conventional wire-type cutter 119 (FIGURE 1). When the inner section 116 is severed from column 110, it is allowed to drop down into resting engagement on the inner periphery of the severed section 118 of the outer column 112 as shown in FIGURE 3.

Sections 116 and 118, still retained in their nested relation shown in FIGURE 3, are removed from conveyor 14 and placed as a unit in the drying station. Thereafter sections 116 and 118 are removed from the drying station 16 and, while still in their nested relation, are placed in kiln 18, where they are concomitantly fired. Thus, two sizes of the green ware are dried and fired simultaneously. The power, it has been found, consumed in concomitantly drying and firing section 116 and 118 is essentially the same as the power normally consumed in drying and firing only one size of the tile or other ware. As a result, productive capacity is effectively doubled in cutting, drying and firing without any corresponding increase in power or labor consumed. After the tile or ware is dried and fired and removed from station 18, section 116 is removed from section 118 and both sections are then stored.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an extrusion apparatus for producing conduits and having a barrel formed with a discharge end and a feed opening disposed remotely from said discharge end for introducing an extrudable material, and screw means rotatable within said barrel for delivering said material under pressure to said discharge end, the improvement of a die structure mounted on said barrel at said discharge end for extruding said material to simultaneously emerge as continuous, radially spaced inner and outer hollow, discrete, unconnected coaxially nested columns of essentially annular cross-section, said die structure comprising:

(a) a central cylindrical core member,
    (b) an annular member disposed in concentrically surrounding radially spaced apart relation to said core member to form therewith a first unobstructed annular extrusion throat section,
    (c) an outer centrally apertured support member fixed to said barrel,
    (d) an outer die member rigidly fixed to and supported solely from said support member in concentrically, radially spaced apart relation to said annular member therewith a second unobstructed annular extrusion throat section disposed concentrically about said first extrusion throat section, and
    (e) means rigidly supporting said core member and said annular member solely from said outer die member and comprising:
    (f) a cylindrical part coaxially fixed to and solely supporting said core member and extending rearwardly into said barrel,
    (g) a bridging member having a hub fixed on the rearward end of said cylindrical part and a plurality of arms formed rigid with said hub and extending radially outwardly across the path of material moving toward said first and second extrusion throat sections at the discharge end of said barrel,
    (h) means axially aligned with said arms for fixedly supporting said annular member solely from said bridging member and said cylindrical part, and
    (i) means fixedly supporting said arms solely to the rearward end of said outer die member for supporting said bridging member and said cylindrical part solely from said outer die member,
    (j) said arms being located axially rearwardly of the entrances to said first and second extrusion throat sections to enable the pressurized material passing therearound to knit and form a solid annular mass before extrusion through said first and second throat sections.

2. A die structure for extruding clay like material in the form of continuous, radially spaced apart, unconnected, coaxially nested columns of essentially annular cross section, said die structure comprising a central cylindrical core member, an outer die member disposed in concentrically surrounding, radially spaced apart relation to said core member, an intermediate annular die member disposed in radially spaced apart relation between said outer die member and core member in concentric relation to said core member to respectively define with said core member and said outer die member concentric, radially spaced apart, unobstructed extrusion throats of essentially annular cross section, and means for supporting said core member, said intermediate die member, and said outer die member in fixed radially spaced apart relation to each other, said means comprising: a cylindical part rigid with and supporting said core member, said cylindrical part extending coaxially rearwardly from said core member in an upstream direction relative to material flow through said throats, a bridging member having a plurality of angularly spaced apart arms rigid with and extending radially from said cylindrical part across the material flow path leading axially toward said throats at a distance spaced axially rearwardly of core member and said intermediate member, mounting means axially aligning with said arms for supporting said intermediate member from said arms in fixed relation to said core member, means including an annular portion rigid with said outer die member for fixedly supporting said outer die member from said arms, said annular portion defining with said cylindrical part an annular chamber extending axially between said arms and said throats and interrupted only by said mounting means, said mounting means extending substantially only axially between said intermediate member and each of said arms in radially inwardly spaced relation to the outer periphery of said annular chamber to enable the mass of material radially split by flow around said arms to reform into a substantially solid annular plug having uninterrupted inner and outer surfaces filling said chamber before entry into said throats.

References Cited by the Examiner

UNITED STATES PATENTS

| | | | |
|---|---|---|---|
| 938,047 | 10/09 | Fish | 25—17 |
| 1,725,959 | 8/29 | Heath | 25—17 |
| 2,245,181 | 6/41 | Brooks | 25—156 |
| 2,572,063 | 10/51 | Skipper | 25—156 |

ROBERT F. WHITE, *Primary Examiner.*

ALEXANDER H. BRODMERKEL, *Examiner.*